Patented May 21, 1929.

1,714,180

UNITED STATES PATENT OFFICE.

SAMUEL M. McELVAIN, OF MADISON, WISCONSIN.

PIPERIDINE DERIVATIVE AND PROCESS OF PRODUCING THE SAME.

No Drawing.   Application filed June 3, 1926.  Serial No. 113,558.

The present invention relates to a new composition of matter and a new process of producing the same.

The primary object of the invention is the production of novel compounds having useful purposes, some of these compounds having characteristics which render them especially suitable for use as local anesthetics.

The novel compounds produced by the novel process herein described are in the nature of piperidine derivatives having the following general formula:

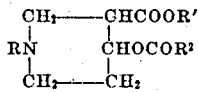

In the above formula, R and R' represent various alkyl groups, and $R^2$ represents an aromatic grouping. An example of a substance having the formula given above, is 1-alkyl-3-carbalkoxy-4-piperidyl benzoate.

Compounds of the character designated in the above formula may be prepared in the following manner. A primary alkyl amine, such as isoamyl is caused to react with alkyl β halogen propionate, preferably ethyl-β-bromopropionate, in alcoholic solution. This reaction may be carried out with or without a condensing agent, such as silver oxide, to give the tertiary amine, β, β' dicarbalkoxy diethyl alkyl amine. The reaction stated may be carried out without artificial heating. The tertiary amine thus produced is separated from the mixture, as by distilling off the alcohol. The tertiary amine is then purified by fractional distillation. The purified tertiary amine is then condensed, either alone or in the presence of a non-reacting diluting solvent, such as benzene, toluene, xylene, or cymene, by means of a condensing agent, such as an alkali metal, an alkali metal alkoxide, or an alkali metal amide. The condensing may be effected by heating, for example, at 100–150° C. for thirty minutes. Thus, one obtains, in the illustration given, a compound which may be designated 1-alkyl-3-carbalkoxy-4-piperidone. The piperidone yields, on reduction with a suitable agent, such as sodium amalgam, or a catalytic reduction agent, such as platinum, the corresponding 4-hydroxy piperidines. The reduction may be accomplished without heating by sodium amalgam in aqueous solution; or by shaking with hydrogen under pressure and platinum as a catalyst a solution of the piperidone in water or alcohol.

The hydroxy piperidine thus produced is then acylated, for example, by a treatment with benzoyl chloride or benzoic anhydride, or substituted derivatives thereof, to correspond to the compound designated by the formula given above. Where the acylation is accomplished by benzoylating the piperidine with benzoyl chloride, for example, the resultant product is a base which may be designated 1-alkyl-3-carbalkoxy-4-piperidyl benzoate.

Such a base may be converted to a salt by treatment with a suitable acid, such as lactic, tartaric, phosphoric, sulphuric, hydrochloric, etc. Such a salt is soluble in water and suitable for use as a local anæsthetic. The lactate may be represented by the formula:

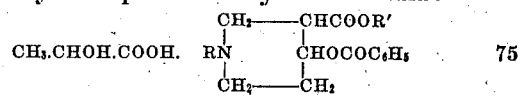

and the hydrochloride may be represented as

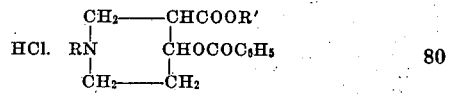

I have discovered and produced a series of compounds having the general formula stated above which may be readily converted into the corresponding salts by treatment with acid; and some of these salts have been demonstrated to possess very strong anesthetic properties and to be, at the same time, of markedly low toxicity. It is possible to produce, for example, local anesthetics by the improved process having many times the anesthetic power of cocaine. Again, it is possible to produce by the improved process a local anesthetic of considerably greater anesthetic power than cocaine and having decidedly less toxicity.

The following examples will serve to illustrate the process and the products, or compounds, which may be produced in accordance with the present invention:

*Example I.—1-isoamyl-3-carbethoxy-4-piperidyl benzoate.*

A solution of 32 g. of isoamyl amine in 400 cc. of 95% alcohol is treated with 70 g. of ethyl β-bromopropionate and the solution stirred until the heat of the reaction subsides. Then, with stirring continued, 80 g. of silver oxide is added followed by 35 g. more of the ethyl β-bromopropionate. After the heat caused by this addition has subsided, 40 g. more of silver oxide is added. This is followed by another 35 g. portion of the propionate and 40 g. portion of the oxide. The mixture is stirred for one hour. After this the silver halide is filtered off and the alcohol is distilled off of the filtrate. The remaining oil is distilled and the fraction boiling at 160–190° at 2 mm. of mercury is collected as $\beta, \beta'$ dicarbethoxy diethyl isoamyl amine. Temperatures stated herein are centigrade.

A solution of 42 g. of this tertiary amine in 50 cc. of xylene is treated with 3.5 g. of powdered sodium in an oil bath at the refluxing temperature of the xylene for thirty minutes. The reaction mixture is cooled and extracted with water. The aqueous layer is chilled and acidified to Congo red with hydrochloric acid. The acid solution is then made alkaline with potassium carbonate and the piperidone extracted with ether. The piperidone is then precipitated from the ether as the hydrochloride. This salt recrystallized from an alcohol-ether mixture is a white crystalline product which melts at 155°.

A solution of 10 g. of the piperidone hydrochloride in absolute alcohol is shaken with hydrogen under pressure in presence of a suitable catalyst, such as platinum, until a test portion of the solution shows no red coloration with ferric chloride solution. The catalyst is then filtered from the solution, and the solution evaporated to dryness in vacuo. Twenty cc. of benzoyl chloride is added to the residue from the evaporation and the mixture is heated in an oil bath at 160–180° until the evolution of HCl ceases. The resulting reaction mixture is diluted with ether and the precipitated 1-isoamyl-3-carbethoxy-4-piperidyl benzoate hydrochloride is recrystallized from an alcohol-ether mixture. It is a white product which melts at 181°.

The foregoing reactions may be graphically illustrated as follows:

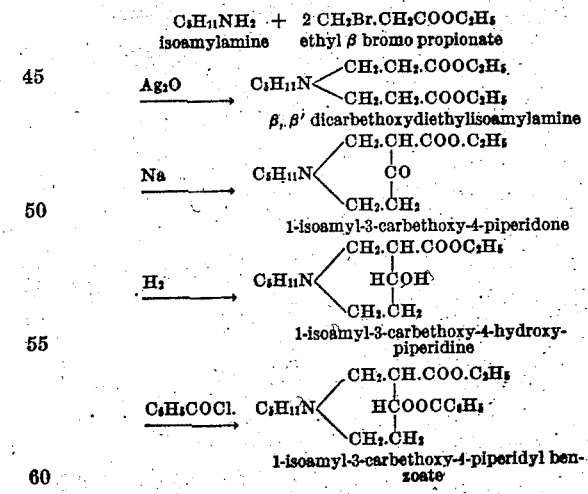

*Example II.*—*1-n-amyl-3-carbethoxy-4-piperidyl benzoate.*

This compound is prepared in the same manner as the isoamyl derivative except that n-amyl amine is used instead of isoamyl amine. It will be understood that the various steps set forth in connection with Example I are repeated in carrying out Example II.

The tertiary amine fraction used boils at 160–190° at 2 mm. The 1-n-amyl-3-carbethoxy-4-piperidone hydrochloride melts at 143°. The 1-n-amyl-3-carbethoxy-4-piperidyl benzoate hydrochloride melts at 166°.

*Example III.*—*1-n-butyl-3-carbethoxy-4-piperidyl benzoate.*

This compound is prepared by the above procedure using 27 g. of n-butyl amine instead of the amyl amine. The tertiary amine fraction boils at 140–160°. The piperidone hydrochloride melts at 129°, and the 1-n-butyl-3-carbethoxy-4-piperidyl benzoate hydrochloride melts at 177°.

*Example IV.*—*1-isobutyl-3-carbethoxy-4-piperidyl benzoate.*

This compound is prepared by the same procedure as the n-butyl compound. The tertiary amine fraction boils at 140–160°. The piperidone hydrochloride melts at 126°. The 1-isobutyl-3-carbethoxy-4-piperidyl benzoate hydrochloride melts at 199°.

*Example V.*—*1-isoamyl-3-carbethoxy-4-piperidyl-p-amino benzoate.*

The residue, described in Example I, resulting from the evaporation in vacuo of the solution of the reduction product of 1-isoamyl-3-carbethoxy-4-piperidone hydrochloride is treated with 20 g. of p-nitrobenzoyl chloride and the mixture is heated in an oil bath at 140–160° until the evolution of HCl ceases. The reaction mixture is cooled, diluted with ether and the precipitated hydrochloride of the p-nitro benzoate is recrystallized from an alcohol-ether mixture. It melts at 169°.

A solution of 10 g. of this salt in alcohol is shaken with hydrogen under pressure in the presence of a suitable catalyst, such as platinum, until the necessary amount of hydrogen for the reduction is absorbed. The catalyst is filtered from the solution and the solution evaporated to dryness in vacuo. The base may be isolated as the dihydrochloride. After crystallization from alcohol-ether mixture, the dihydrochloride of 1-isoamyl-3-carbethoxy-4-piperidyl-p-amino benzoate appears as a white product melting at 215°.

*Example VI.*—*1-isobutyl-3-carbethoxy-4-piperidyl-p-amino benzoate.*

This compound is prepared in the manner which has been described for the isoamyl derivative in Example V, using the corresponding isobutyl derivatives instead of the isoamyl derivative. The hydrochloride of the p-nitro benzoate melts at 206°. The dihydrochloride of 1-isobutyl-3-carbethoxy-4-piperidyl-p-amino benzoate melts at 232°.

*Example VII.—1-n-butyl-3-carbethoxy-4-piperidyl-p-amino benzoate.*

This substance is prepared by the procedure given in Example V, using the corresponding n-butyl derivative instead of the isoamyl derivative. The hydrochloride of the p-nitro benzoate melts at 194°. The dihydrochloride of 1-n-butyl-3-carbethoxy-4-piperidyl-p-animo benzoate melts at 230°.

Examples of primary alkyl amines which may be used in the process are methyl, ethyl, n-propyl, isopropyl, secondary butyl, isoamyl, n-amyl, and other of the higher alkyl amines. The amyl amines appear to be particularly good in the process, and especially isoamyl.

Examples of alkyl β halogen propionates which may be employed are methyl, ethyl, and n-propyl. The use of ethyl β-bromopropionate is preferred.

Examples of condensing agents for converting the tertiary amines to piperidones are the alkali metals, alkali metal alkoxides and alkali metal amides, such as sodium, sodium ethoxide, etc.

Examples of reducing agents for reducing the piperidones to hydroxy piperidines are sodium amalgam in aqueous solution, and hydrogen under pressure, with platinum, palladium, or nickel, as a catalyst, the piperidones being preferably in alcoholic solution.

Examples of acylating agents suitable for converting the hydroxy piperidines to the piperidyl benzoates, for example, are benzoyl chloride, methyl benzoyl chlorides, benzoic anhydride, methyl benzoic anhydrides, nitro-benzoyl chlorides, etc. In the case of nitro-benzoyl chloride, the acylating action is followed by the use of a reducing agent, such as iron or tin, in acid solution, or by catalytic reduction with hydrogen under pressure in the presence of a catalyst, such as platinum, palladium, or nickel. The reduction product obtained by either of the last-mentioned methods may be converted into a salt by treatment with acid, or it may be first alkylated to substitute either one or two alkyl groups, and then converted into a salt by treatment with acid. Alkylated products of the following general formulæ can thus be produced

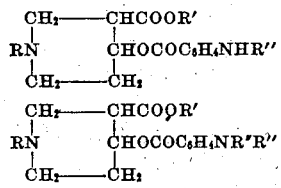

where R, R′, R″, and R‴ are alkyl radicals.

Among the acids which may be used for forming the salts may be mentioned lactic, tartaric, phosphoric, sulfuric, hydrochloric and other acids.

In some cases, the use of organic acids is particularly desirable as tending to produce a salt which will be non-irritating because more nearly neutral. It may be mentioned, however, that in the case of the amino benzoates, good results are obtained by the use of mineral acids, such as hydrochloric or sulfuric, to produce the salts.

The examples given above are illustrative of the process and products of my invention, or discovery. In the appended claims, the expression "phenyl group" is used to designate both the non-substituted phenyl group and the substituted phenyl groups.

It is to be understood that I intend to be protected broadly for novel compounds of the type herein described and derivatives thereof including bases, salts or substitution products thereof.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A piperidine derivative whose formula includes the grouping

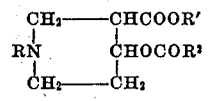

in which R and R′ are alkyl groups and R² is an aromatic grouping.

2. A piperidine derivative whose formula includes the grouping

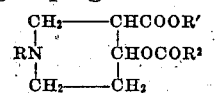

in which R and R′ are alkyl groups and R² comprises a phenyl group.

3. A composition as expressed in claim 2, in which R² comprises a substituted phenyl group.

4. A composition as expressed in claim 2, in which R² is an amino substituted phenyl group.

5. A composition as expressed in claim 2, in which R² is an alkyl-amino substituted phenyl group.

6. A composition as expressed in claim 2, in which R² is a di-alkyl-amino substituted phenyl group.

7. The composition stated in claim 2, in which R′ is an alkyl group having not more than three carbon atoms.

8. The composition stated in claim 2, in which R′ is an ethyl group.

9. The composition stated in claim 1, in which R′ is an alkyl group having not more than three carbon atoms.

10. The composition stated in claim 2, in which R is an alkyl group containing more than three carbon atoms.

11. A composition as stated in claim 2, in which R is an alkyl group containing more than three and less than six carbon atoms.

12. A composition as stated in claim 2, in which R is an amyl radical.

13. A composition as stated in claim 2, in which R is an isoamyl radical.

14. A composition as stated in claim 1, in which R is an amyl radical.

15. A composition as stated in claim 2, in which R is an amyl radical, and R' is an alkyl group having not more than three carbon atoms.

16. A composition as stated in claim 2, in which R' is an alkyl group having not more than three carbon atoms and R² is a substituted phenyl group.

17. The salt of an acid and a base in accordance with the formula stated in claim 1.

18. The salt of an acid and a base in accordance with the formula stated in claim 2.

19. The salt of an acid and a base in accordance with the formula stated in claim 2 in which R² is a substituted phenyl group.

20. The salt of an acid and a base in accordance with the formula stated in caim 2 in which R is an amyl radical.

21. The salt of a mineral acid and a base in accordance with the formula set forth in claim 2 in which R² is an amino-substituted phenyl group.

22. The hydrochloride of a base in accordance with the formula of claim 2 in which R² is an amino-substituted phenyl group.

23. The process which comprises: causing a reaction between a primary alkyl amine and alkyl β-halogen propionate, separating the β, β' dicarbalkoxy diethyl alkyl amine thus produced and condensing it by heating with a condensing agent adapted to eliminate a molecule of alcohol, thus forming 1-alkyl-3-carbalkoxy-4-piperidone, treating the last-mentioned product with a reducing agent and thereby converting the ketone group thereof into an alcohol group, acylating with an agent containing a nitro-substituted phenyl group, reducing the nitro-group and alkylating the resultant primary amino group.

SAMUEL M. McELVAIN.